US009446651B2

(12) United States Patent
Giovanardi et al.

(10) Patent No.: US 9,446,651 B2
(45) Date of Patent: Sep. 20, 2016

(54) ANTI-CAUSAL VEHICLE SUSPENSION

(71) Applicant: Bose Corporation, Framingham, MA (US)

(72) Inventors: Marco Giovanardi, Melrose, MA (US); David J. Warkentin, Boston, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 14/790,070

(22) Filed: Jul. 2, 2015

(65) Prior Publication Data

US 2016/0121685 A1    May 5, 2016

Related U.S. Application Data

(63) Continuation of application No. 13/534,800, filed on Jun. 27, 2012, now Pat. No. 9,102,209.

(51) Int. Cl.
*B60G 17/0165* (2006.01)

(52) U.S. Cl.
CPC ..... *B60G 17/0165* (2013.01); *B60G 2400/821* (2013.01); *B60G 2600/182* (2013.01); *B60G 2800/164* (2013.01)

(58) Field of Classification Search
CPC ............ B60G 17/0165; B60G 17/016; B60G 2400/821; B60G 2800/164; B60G 2600/182
See application file for complete search history.

(56) References Cited

U.S. PATENT DOCUMENTS

| | | | | |
|---|---|---|---|---|
| 5,823,307 A * | 10/1998 | Schubert | ................ | E04B 1/985 188/378 |
| 5,848,663 A * | 12/1998 | Kuriki | ............... | B60G 17/0195 180/300 |
| 6,157,879 A * | 12/2000 | Kwack | ............... | B60G 17/0165 280/5.5 |
| 7,938,410 B2 * | 5/2011 | Buma | ................ | B60G 17/0157 280/124.108 |
| 8,285,448 B2 * | 10/2012 | Inoue | ..................... | B60G 15/08 280/5.514 |
| 9,278,599 B2 * | 3/2016 | Hirao | ................... | B60G 17/018 |
| 2004/0150361 A1* | 8/2004 | Hio | .................... | B60G 17/0165 318/375 |
| 2005/0178628 A1* | 8/2005 | Uchino | ................ | B60G 17/016 188/379 |
| 2009/0121444 A1* | 5/2009 | Bushko | .............. | B60G 17/0157 280/5.507 |
| 2010/0106368 A1* | 4/2010 | Hidaka | .............. | B60G 17/0165 701/38 |
| 2013/0057399 A1* | 3/2013 | Panse | ................... | B60G 17/017 340/440 |
| 2013/0166149 A1* | 6/2013 | Liu | ...................... | B60G 17/015 701/37 |

FOREIGN PATENT DOCUMENTS

| | | | | |
|---|---|---|---|---|
| JP | EP 0260418 A2 * | 3/1988 | ......... | B60G 17/0165 |
| JP | EP 0563845 A1 * | 10/1993 | ......... | B60G 17/0182 |

* cited by examiner

*Primary Examiner* — Tuan C. To

(74) *Attorney, Agent, or Firm* — Brian M. Dingman; Dingman IP Law, PC

(57) ABSTRACT

A vehicle suspension and wheel damper using anti-causal filtering. Information from in front of a wheel or information about an operating condition of a vehicle is used to anti-causally determine a response of an active suspension associated with the wheel.

20 Claims, 12 Drawing Sheets

Direction of Travel

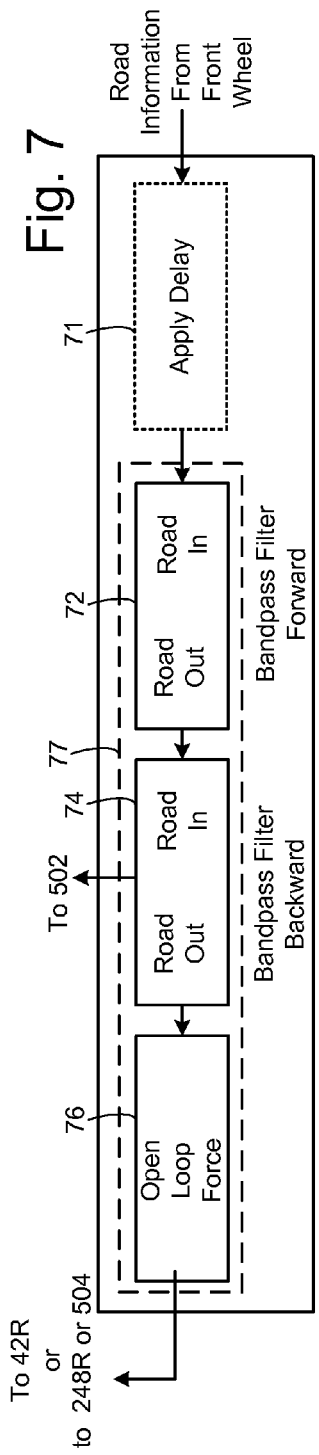
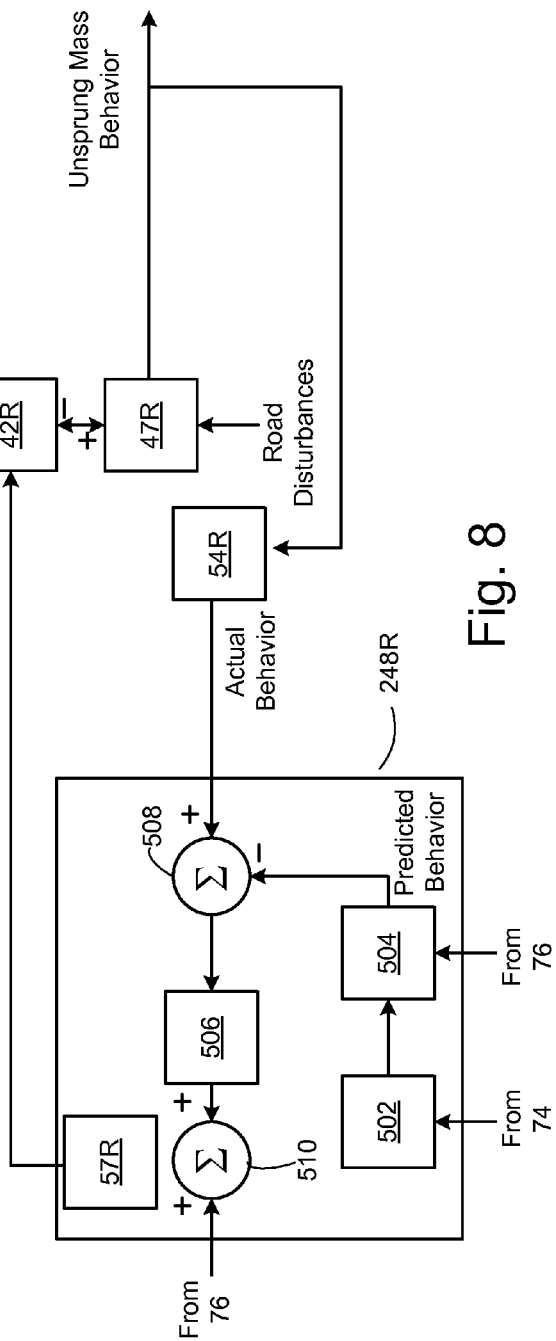

ANTI-CAUSAL VEHICLE SUSPENSION

CROSS-REFERENCE TO RELATED APPLICATIONS

This application is a continuation of application Ser. No. 13/534,800, filed on Jun. 27, 2012. The disclosure of this prior patent application is incorporated herein in their entirety.

BACKGROUND

This specification relates to vehicle suspensions and vehicle wheel dampers. Vehicle suspensions attempt to eliminate or reduce vertical displacement of a sprung mass, typically including a passenger compartment, resulting from the vehicle encountering road disturbances. Wheel dampers attempt to eliminate or reduce "wheel hop" which is a tendency for a vehicle wheel to lose contact with the road under some circumstances.

SUMMARY

In one aspect, a method for operating a suspension system associated with a wheel of a vehicle includes identifying a road disturbance prior to the wheel's encountering the road disturbance; determining, prior to the wheel's encountering the road disturbance, an estimated response of the suspension system to the road disturbance; and reversing with respect to time the estimated response of the suspension system to provide an anti-causal response. The method may further include scaling the anti-causal response to provide a scaled anti-causal response. The determining may determine the estimated response over a first period of time and the method may include causing the controllable force source to apply the anti-causal response over a second period of time, shorter than the first period of time. The wheel may be a rear wheel and the identifying the road disturbance may include processing data from a motion sensor associated with a front wheel. The method may be operated in a narrow frequency band to control wheel hop. The method may be operated in a broad frequency band not including the narrow frequency band to control the vertical displacement of a car body. The method may further include filtering the anti-causal response with a nonlinear filter. The nonlinear filter may be one of a deadband filter or a clipper. The anti-causal response may cause the suspension system to reduce vertical motion of an unsprung mass of the vehicle over a first frequency range and controls vertical motion of a sprung mass of the vehicle over a second frequency range embracing the first frequency range but not including the first frequency range.

In another aspect, a method for operating an active suspension system associated with the wheel of a vehicle includes identifying a road disturbance prior to the wheel's encountering the road disturbance; determining, prior to the wheel's encountering the road disturbance, what at least two states of the vehicle would be when the wheel encounters the road disturbance to provide estimated state values; determining, prior to the wheel's encountering the road disturbance, a force to cause the at least two states of the vehicle to have the estimated state values to provide an anti-causally determined force; and causing a controllable force source, associated with the active suspension system, to apply the anti-causally determined force so that the values of the at least two states of the vehicle are the estimated state values when the wheel encounters the road disturbance. The determining may include determining an estimated response of the suspension system to the road disturbance, prior to the wheel's encountering the road disturbance; reversing with respect to time the estimated response of the suspension system to provide a reversed anti-causal response; and causing a controllable force source to apply the reversed anti-causal response prior to the wheel's encountering the road disturbance. The two state values may be the vertical position of the wheel and the vertical velocity of the wheel. The method may be operated in a narrow frequency band to control wheel hop. The method may be operated in a broad frequency band not including the narrow frequency band to control the vertical displacement of a car body. The method may further include filtering the anti-causal response with a nonlinear filter. The nonlinear filter may be one of a deadband filter or a clipper. The anti-causally determined force may cause the suspension system to reduce vertical motion of an unsprung mass of the vehicle over a first frequency range and to control vertical motion of a sprung mass of the vehicle over a second frequency range embracing the first frequency range but not including the first frequency range.

In another aspect, a method for operating an active suspension for a vehicle includes anti-causally calculating a force to be applied to a portion of the vehicle; calculating a predicted behavior of the portion of the vehicle resulting from the force being applied to the portion of the vehicle; comparing the predicted behavior with the actual behavior of the vehicle to provide an error signal; determining a correcting force to reduce the error signal; combining the correcting force with the anti-causally calculated force to provide a combined force; and applying the force to the vehicle portion. The portion of the vehicle may be an unsprung mass of the vehicle. The method may be operated in a frequency band included a wheel hop resonance frequency to control vertical motion of the unsprung mass. The portion of the vehicle may be the sprung mass of the vehicle.

In another aspect, an apparatus includes a vehicle cabin; unsprung vehicle components, including a wheel; a suspension element, comprising a sensor for identifying a road disturbance prior to the wheel's encountering the road disturbance; logic for anti-causally determining a force to reduce vertical displacement of a portion of the vehicle resulting from the wheel's encountering the road disturbance; and a force source for exerting the anti-causally determined force prior to the wheel's encountering the road disturbance. The logic for anti-causally determining the force may determine a force to reduce vertical displacement of the unsprung mass over a first range of frequencies and may determine a force to reduce displacement of the sprung mass over a range of frequencies above the first range of frequencies and a range for frequencies below the first range of frequencies. The logic for anti-causally determining the force to reduce vertical displacement of a portion may include logic for determining, prior to the wheel's encountering the road disturbance, an estimated response of the suspension system to the road disturbance; and for reversing with respect to time the estimated response of the suspension system to provide the anti-causally determined force. The logic for anti-causally determining the force to reduce vertical displacement of a portion may include logic for determining, prior to the wheel's encountering the road disturbance, what at least two states of the vehicle would be when the wheel encounters the road disturbance to provide estimated state values; and for determining, prior to the wheel's encountering the road disturbance, a force to cause the at least two states of the vehicle to have the estimated state values to provide an anti-causal force. The logic for anti-causally determining the force to reduce vertical displacement of a portion includes logic for calculating, from a model of a road surface and a model of the vehicle, a predicted behavior of the portion of the vehicle resulting from the force being applied to the portion of the vehicle; for comparing the predicted behavior with the actual behavior of the vehicle to provide an error signal; for determining a correcting force to reduce the error signal; for combining the correcting force with the anti-causally calculated force to provide a combined force; and for applying the force to the vehicle.

Other features, objects, and advantages will become apparent from the following detailed description, when read in connection with the following drawing, in which:

BRIEF DESCRIPTION OF THE SEVERAL VIEWS OF THE DRAWING

FIG. 7 is a block diagram of an anti-causal filter;

FIG. 8 is a block diagram of a rear suspension controller;

DETAILED DESCRIPTION

Figure 1:
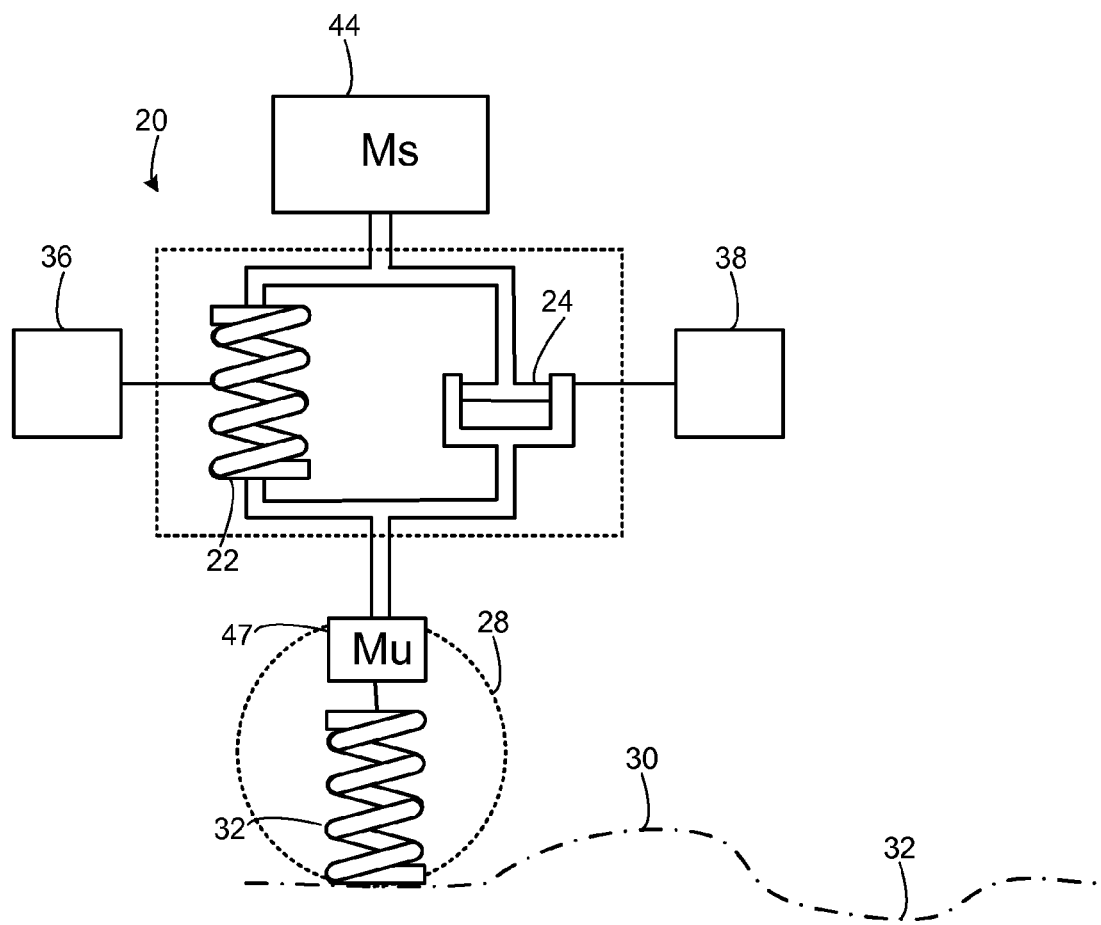
FIG. 1 is a logical arrangement of a vehicle suspension element.

Though the elements of several views of the drawing may be shown and described as discrete elements in a block diagram and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Operations may be performed by analog circuitry or by a microprocessor executing software that performs the mathematical or logical equivalent to the analog operation. Unless otherwise indicated, signal lines may be implemented as discrete analog or digital signal lines, as a single discrete digital signal line with appropriate signal processing to process separate streams of signals, or as elements of a wireless communication system. Some of the processes may be described in block diagrams. The activities that are performed in each block may be performed by one element or by a plurality of elements, and may be separated in time. This specification describes a vehicle suspension system. For simplicity of explanation, some of the figures and explanations show and describe a single wheel and suspension. Actual implementations may have four or more wheels and a corresponding number of suspensions. Some of the figures and explanations show a front wheel and suspension and a rear wheel and suspension. Actual implementations may have two or more sets of front and rear wheels and corresponding suspensions.

FIG. 1 shows a logical arrangement of a prior art single wheel vehicle suspension system. The suspension 20 includes a spring 22 and a damper 24. In operation, the spring 22 acts to oppose, and the damper 24 acts to damp, vertical motion of the sprung mass Ms 44 (that is, the components of the vehicle that are supported by the spring 22, for example including the passenger compartment). Control elements 36 and 38 will be described below.

In the suspension of FIG. 1, the spring 22 exerts a force only if a vertical mechanical stimulus (for example resulting from a road disturbance) is applied to the spring. The magnitude of the force is $F_{spring}=-kx$ (where k is a constant representing the stiffness of the spring and x is the displacement of the spring). The magnitude of the force exerted by the spring is determined solely by the displacement x and the current value of the spring constant k. A control element 36 may modify the stiffness k of the spring, but it cannot cause the spring to exert a force absent any displacement, nor can it cause the spring to exert a force with a magnitude other than |kx|. Furthermore, the force exerted by the spring can only be in a direction opposite to the displacement. The force cannot be applied before the displacement occurs. Suspensions with these characteristics will be referred to herein as "passive". Passive suspensions with a control element 36 which can vary the stiffness k may be referred to as "semi-active", but are not "active" suspensions, as the term is used herein.

The damper 24 exerts a force $F_{damping}=-cv$, where v is the relative vertical velocity between the unsprung mass and the sprung mass and c is a damping coefficient. A control element 38 may vary the value of the damping coefficient c, but the damping force may never be of a magnitude other than |cv| and must be in the opposite direction of v, as indicated by the minus sign. Dampers with these characteristics will be referred to herein as "passive". Dampers with a control element 38 that can vary the value of c will be referred to as "semi-active", but are not "active" dampers, as the term is used herein.

Since the tire 28 has a compliance, the tire 28 and the unsprung mass 47 (that is, the portion of the vehicle not supported by the spring 22, for example, including the tire 28, the knuckle, brakes and all other parts that move vertically with the wheel) can be modeled as an unsprung mass 47 and a spring 32 representing the compliance of the tire. The spring 32 and mass 47 are components of a resonant system that has a mechanical resonance at a resonant frequency $f_{res}$, typically around 12 Hz. The tire is itself typically lightly damped, so if the tire is excited at frequency $f_{res}$, a significant amount of vertical motion of the wheel may occur, which may cause the tire to lose contact with the road; this is often referred to as "wheel hop".

Wheel hop is undesirable because the partial or complete loss of contact between the tire and the road affects handling and braking. Therefore, various schemes have been developed, for example as described by U.S. Pat. No. 2,955,841 and U.S. Pat. No. 5,392,882 to damp wheel hop. The damping systems typically include a second damper and a damping mass (for example element 68 of U.S. Pat. No.

2,955,841 and element 40 of U.S. Pat. No. 5,392,882). Damping masses are undesirable because they add to the number of mechanical components, the weight and the bulk of the vehicle. In the conventional suspension system of FIG. 1, the damper 24 damps the wheel motion.

Figure 2A:
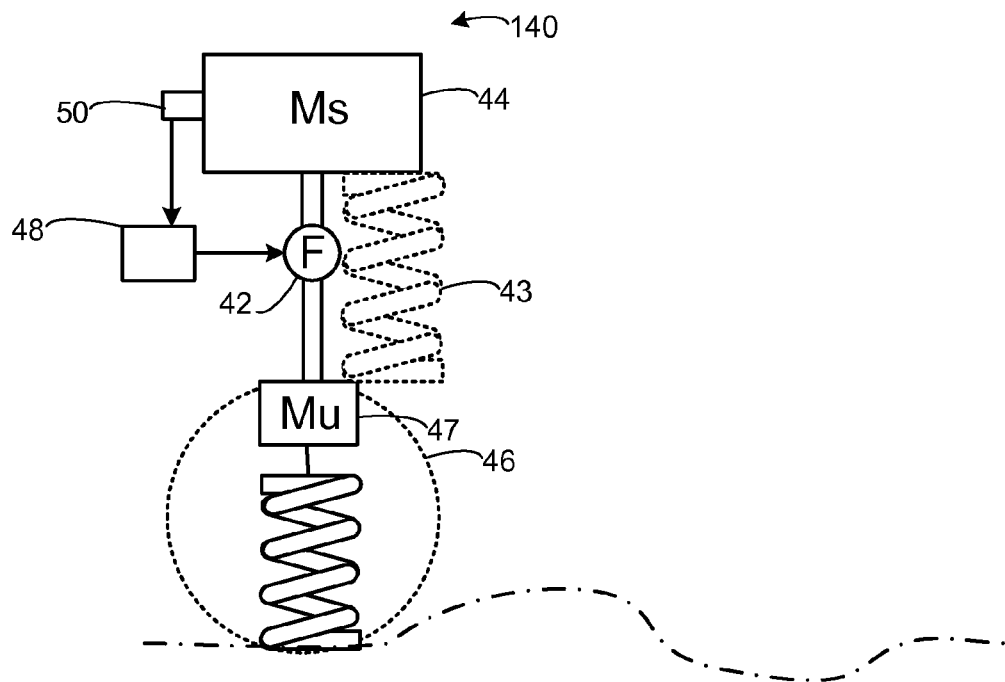
FIG. 2A is a logical arrangement of a vehicle suspension element.

FIG. 2A shows a logical arrangement of a controllable suspension system 140. The controllable suspension system includes an independently controllable force source 42 which couples the sprung portion of the vehicle, including the passenger compartment, modeled as mass Ms 44 and unsprung mass modeled as mass Mu 47, which includes a wheel 46 (plus the knuckle, brakes, and all other parts that move vertically with the wheel), which engages the road or other surface on which the vehicle is travelling. Coupled to the force source 42 is control circuitry 48 which causes the force source 42 to generate a vertical force between the sprung mass 44 and the unsprung mass 47. By convention, positive force is defined as force that urges the sprung mass and the unsprung mass apart, and negative force is defined as force that urges the sprung mass and the unsprung mass together. Unlike the spring 22 of FIG. 1, the force source 42 can generate force in an arbitrary phase and magnitude based on instructions from the control circuitry, and the application force does not need to be in response to any direct stimulus or to displacement, and can even occur before the wheel encounters a road disturbance. Suspension systems with these characteristics will be referred to herein as "active". The suspension system may have a sensor 50 on or in the sprung mass. Sensor 50 is operationally coupled to the controllable force source 42 and detects vertical displacement. The sprung mass 44 and the unsprung mass 47 may be mechanically coupled by a passive suspension element, such as a support spring 43 to support the static weight of the sprung mass. The support spring 43 may be in series or in parallel with the force source 42. The support spring 43 is not relevant to the suspension system described in this specification, so it will be omitted from future figures. An example of a controllable suspension 140 can be found in U.S. Pat. No. 4,981,309 and U.S. Pat. No. 7,195,250.

In some implementations, sensor 50 may not detect vertical displacement directly, but instead may detect a quantity, such as acceleration or velocity, from which displacement can be derived. In some implementations, vertical displacement may not be derived at all, but instead the control circuitry may be designed to operate on the quantity from which vertical displacement can be derived. For example, accelerometers may be used, and the control circuitry may be designed to operate on acceleration data directly rather than converting the acceleration data to vertical displacement data.

Figure 2B:
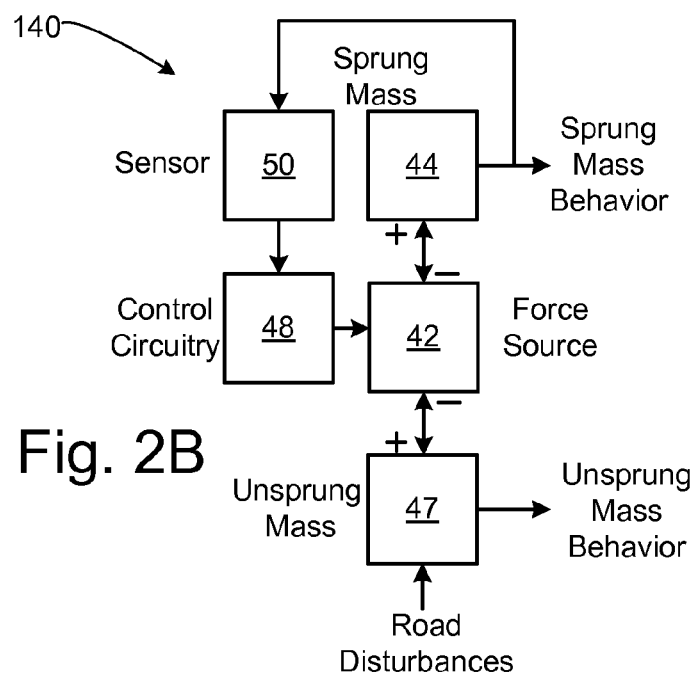
FIG. 2B is a block diagram of the vehicle suspension element of FIG. 2A.

FIG. 2B represents the logical arrangement of suspension system 140 of FIG. 2A, expressed as elements of a block diagram of a closed loop feedback control system. Like numbers refer to the block diagram representation of the corresponding elements of FIG. 2A. Road disturbances cause a force to be applied to unsprung mass 47. At lower frequencies, the force applied to the unsprung mass 47 is transmitted to the sprung mass 44. The sensor 50 detects vertical displacement of the sprung mass 44 and provides a signal representative of vertical displacement to control circuitry 48, which determines an error signal that represents the difference between the desired vertical displacement (typically zero) and the actual vertical displacement. The magnitude, phase, and direction of a force to drive the error signal toward zero are determined by the control circuitry. The control circuitry 48 directs the force source 42 to apply the force determined by the control circuitry 48 between the sprung mass 44 and the unsprung mass 47. By convention, positive force is defined as urging the sprung mass and the unsprung mass apart, and negative force is defined as urging the sprung mass and the unsprung mass together. The system of FIGS. 2A and 2B acts to reduce the vertical displacement of the sprung mass. However, the system of FIGS. 2A and 2B does not control the vertical displacement of the unsprung mass, so the system of FIGS. 2A and 2B does not necessarily act to reduce wheel hop. Schemes have been developed, for example as described U.S. Pat. No. 4,991,698 and U.S. Pat. No. 6,364,078, for use with suspensions such as shown in FIGS. 2A and 2B to damp wheel hop separately from the controllable suspension system 140. U.S. Pat. No. 4,991,698 and U.S. Pat. No. 6,364,078 both include damping masses, and both are "passive" systems (as defined above) that are in addition to, and supplement, the conventional passive or semi-active suspension system of FIG. 1.

Figure 3A:
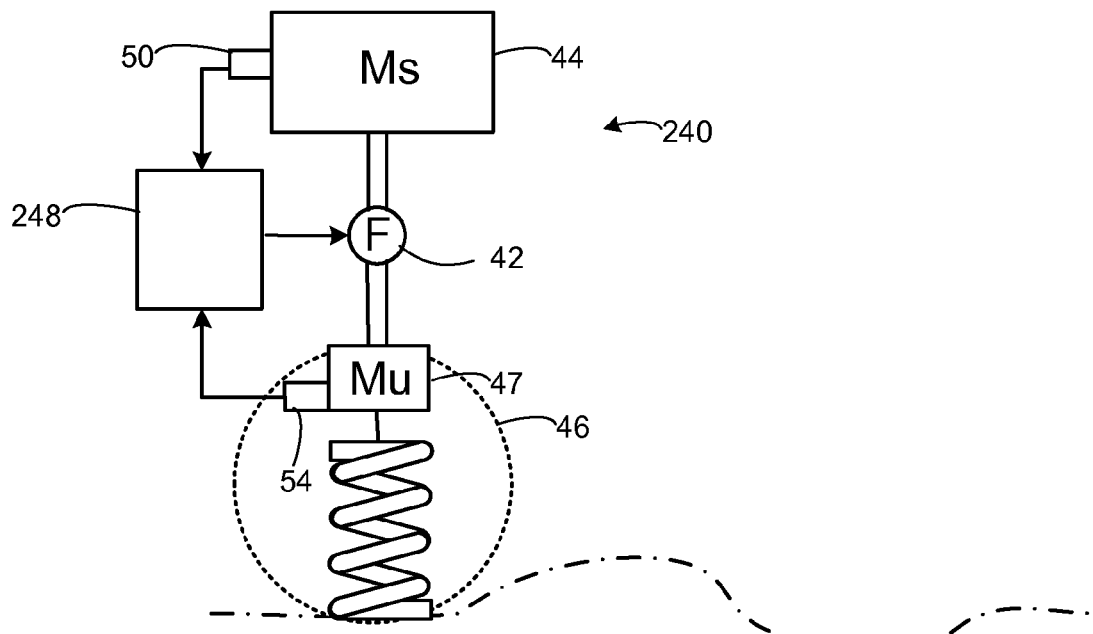
FIG. 3A is a logical arrangement of a vehicle suspension element.
Figure 3B:
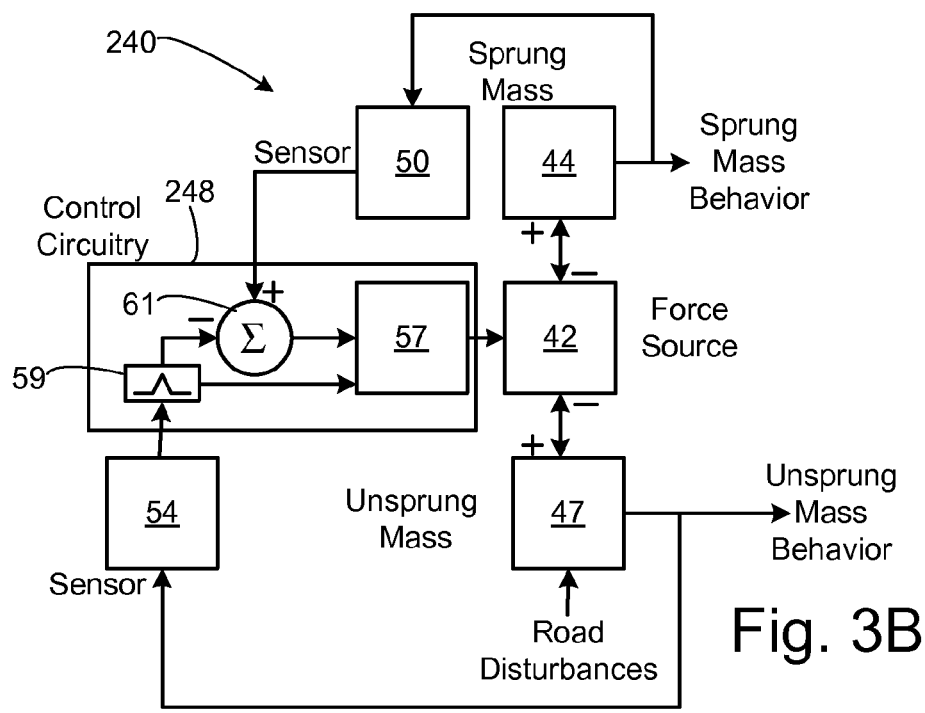
FIG. 3B is a block diagram of the vehicle suspension element of FIG. 3A.

A suspension system 240 for damping wheel hop as well as reducing vertical displacement of the sprung mass is shown in FIGS. 3A and 3B. For simplicity of explanation, the suspension system 240 is described in the form a logical arrangement in FIG. 3A and in the form of a block diagram of a feedback loop in FIG. 3B. Logical equivalents of the suspension system can be implemented by many different combinations of physical elements and microprocessors executing different combinations and sequences of instructions and calculations.

In the logical arrangement of FIG. 3A, the controllable suspension system 240 includes an independently controllable force source 42 which couples the sprung portion of the vehicle, including the passenger compartment, modeled as mass Ms 44 and unsprung mass modeled as mass Mu 47, which includes a tire 46 (plus the knuckle, brakes, and all other parts that move vertically with the wheel), which engages the road or other surface on which the vehicle is travelling. Coupled to the force source 42 is control circuitry 248 which causes the force source 42 to generate a vertical force between the sprung mass 44 and the unsprung mass 47. By convention, positive force is defined as force that urges the sprung mass and the unsprung mass apart, and negative force is defined as force that urges the sprung mass and the unsprung mass together. Similar to the force source of FIGS. 2A and 2B, the force source 42 of FIGS. 3A and 3B can generate force in an arbitrary phase and magnitude based on instructions from the control circuitry 248, and the force does not need to be in response to any direct stimulus or to displacement. The suspension system may have a sensor 50 on or in the sprung mass and a sensor 54 in or on a non-rotating part of the unsprung mass. Sensors 50 and 54 are operationally coupled to the control circuitry 248 and detect vertical displacement (or some quantity such as vertical acceleration or vertical velocity from which vertical displacement can be derived) of the sprung mass and the unsprung mass, respectively. As with the suspension system of FIGS. 2A and 2B, the sprung mass 44 and the unsprung mass 47 may be mechanically coupled by a passive suspension element, such as a support spring which is not relevant to the suspension system described in this specification, so it is omitted.

FIG. 3B represents the suspension system 240 of FIG. 3A, expressed as elements of a block diagram of a closed loop feedback control system. Like numbers refer to the block diagram representations of the corresponding element of FIG. 3A. Road disturbances cause a force to be applied to unsprung mass 47. At lower frequencies, the force is transmitted to sprung mass 44 and at frequencies near $f_{res}$, the force from the road disturbance may cause wheel hop.

Sensor 50 detects vertical displacement of the sprung mass 44 and sensor 54 detects vertical displacement (wheel hop) of the unsprung mass 47. Based on input from the sensors, an error signal is provided to a feedback loop controller 57. In some embodiments, for example as shown in FIG. 3B, the error signal provided to the controller 57 includes output of the unsprung mass sensor 54 at frequencies near $f_{res}$ and does not include the vertical displacement of the unsprung mass sensor 54 at other frequencies. The feedback loop controller 57 determines a force to be applied by the force source 42 between the sprung mass 44 and the unsprung mass 47 to reduce the vertical displacement of the unsprung mass at frequencies near $f_{res}$ and to reduce the vertical displacement of only the sprung mass at other frequencies. By convention, positive force is defined as urging the sprung mass and the unsprung mass apart, and negative force is defined as urging the sprung mass and the unsprung mass together.

Figure 4:
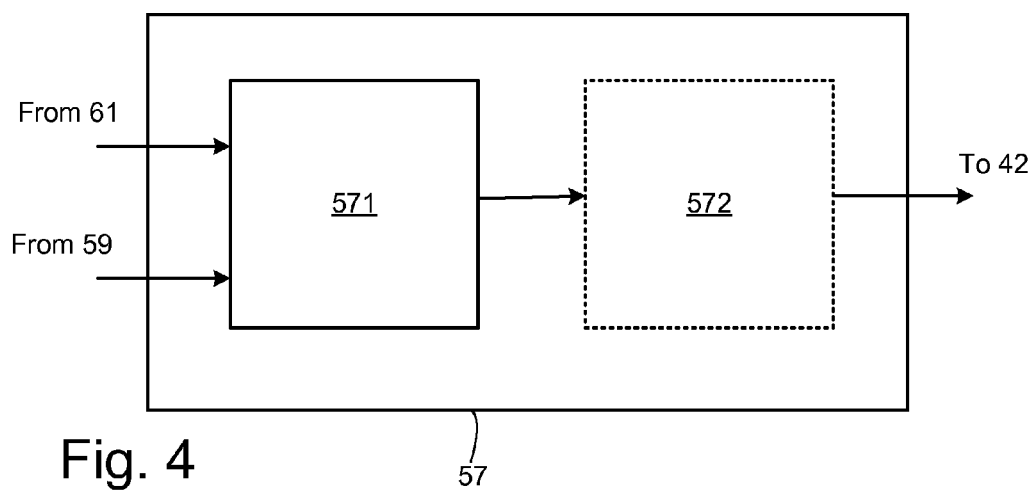
FIG. 4 is a block diagram of a feedback controller.

FIG. 4 shows one implementation of the feedback loop controller 57. The feedback loop controller includes a feedback loop controller 571 and a non-linear processor 572.

In operation, a force determiner 571 determines a force to be applied by force source 42. Before the force command is sent to the force source 42, the force command may be processed by a non-linear processor 572. For example, a deadband filter might be used so that small damping forces (the application of which consumes energy but does not substantially improve ride comfort) are zeroed out. Alternatively to, or in combination with, a deadband filter, a clipper might be used so that extremely large forces determined by the feedback loop controller are limited to a maximum value. It may also be desirable to further process the output of the non-linear filter with a smoothing filter. For example, the output of a clipper might be sent to a low-pass filter that removes high frequency content so that harshness is not injected into the vehicle by the force source 42.

Figure 5:
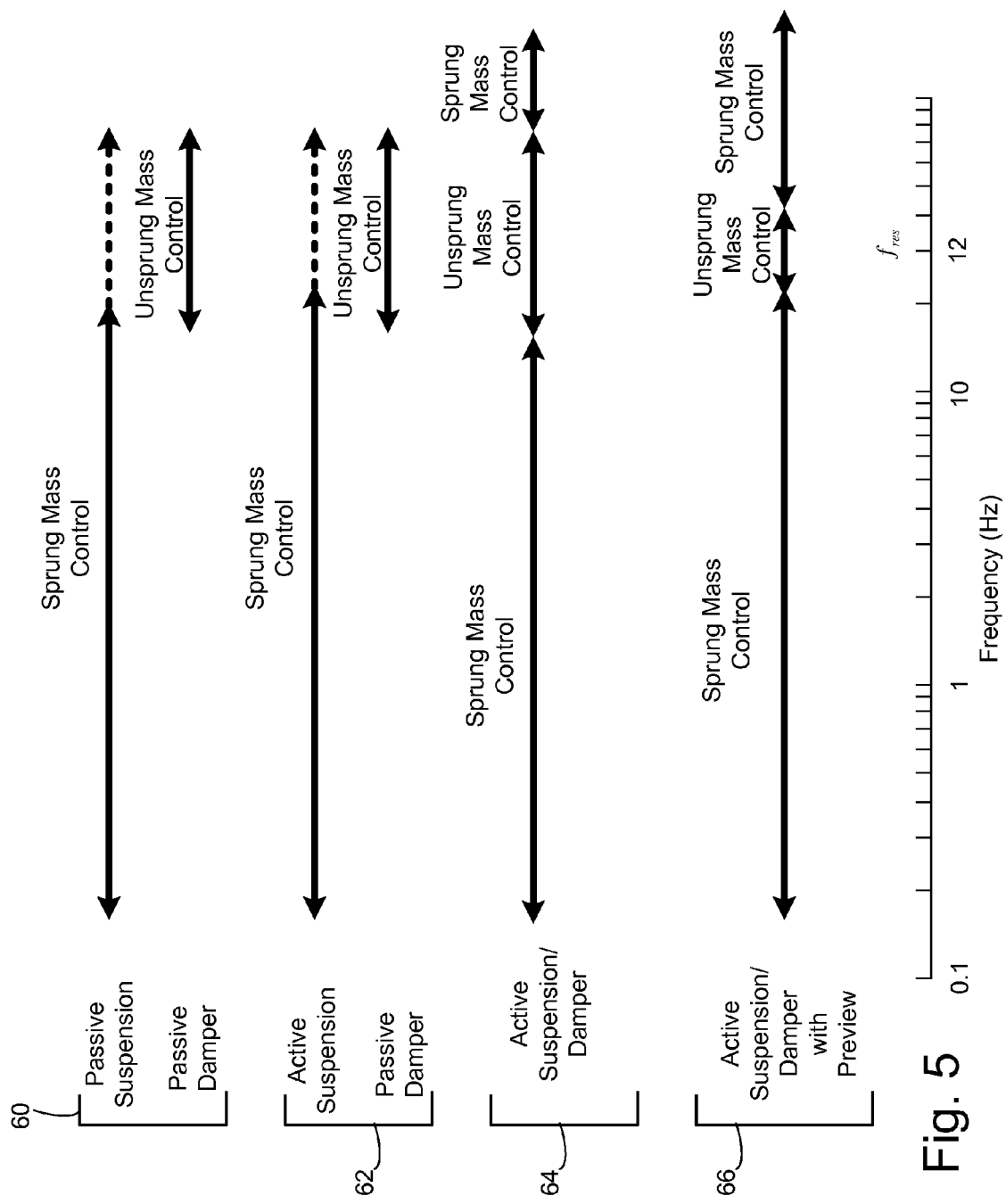
FIG. 5 is a diagram illustrating the operation of various types of suspension and wheel dampers as a function of frequency.

FIG. 5 illustrates various combinations of active and passive suspensions and passive dampers, and shows which masses (sprung or unsprung) are controlled by which suspension elements at various frequency ranges. Diagram 60 shows the operation of a system for examples as shown in FIG. 1, including a passive (as defined above) suspension and a passive (as defined above) wheel damper. The passive wheel damper damps vertical displacement of the unsprung mass throughout its range of operation, typically including $f_{res}$, in this example, 12 Hz. The passive suspension controls vertical displacement of the sprung mass throughout its range of operation. The range of operation of the passive suspension may include the range of operation of the passive wheel damper, as indicated by the dashed line. Diagram 62 shows the operation of a system including an active (as defined above) suspension and a passive damper (for example as described U.S. Pat. No. 4,991,698 and U.S. Pat. No. 6,364,078 damper, which include mass dampers). Similar to diagram 60, in diagram 62, the passive wheel damper damps vertical displacement of the unsprung mass throughout its range of operation, typically including $f_{res}$, in this example, 12 Hz. The active suspension controls vertical displacement of the sprung mass throughout its range of operation. The range of operation of the passive suspension may include the range of operation of the passive wheel damper, as indicated by the dashed line. Diagram 64 represents the operation of the system of FIGS. 3A and 3B, which do not include a passive wheel damper. The active suspension/damper controls vertical displacement of the unsprung mass through an unsprung mass damping band of frequencies including $f_{res}$, in this example, 12 Hz. In frequency bands above and below the unsprung mass damping band of frequencies, the active suspension/damper controls vertical displacement of the sprung mass.

A suspension system according to FIGS. 3A and 3B may permit vertical displacement of the sprung mass in the unsprung mass damping band of frequencies. Since the vertical displacement of the sprung mass might be perceived by the occupants of the vehicle cabin, it is desirable for the unsprung mass damping band of frequencies to be as narrow as possible, as illustrated by diagram 66, which will be described below.

In one implementation, the force source 42 is an electromagnetic actuator as described in U.S. Pat. No. 7,963,529. The controller 248 is a microprocessor processing software instructions. The sensors 50 and 54 may be, for example, displacement sensors as described in U.S. Pat. No. 5,574,445 or, as previously stated, may be accelerometers or sensor of some other quantity from which vertical displacement can be derived. Sensor 54 may be mounted in a non-rotating part of the wheel.

Figure 6A:
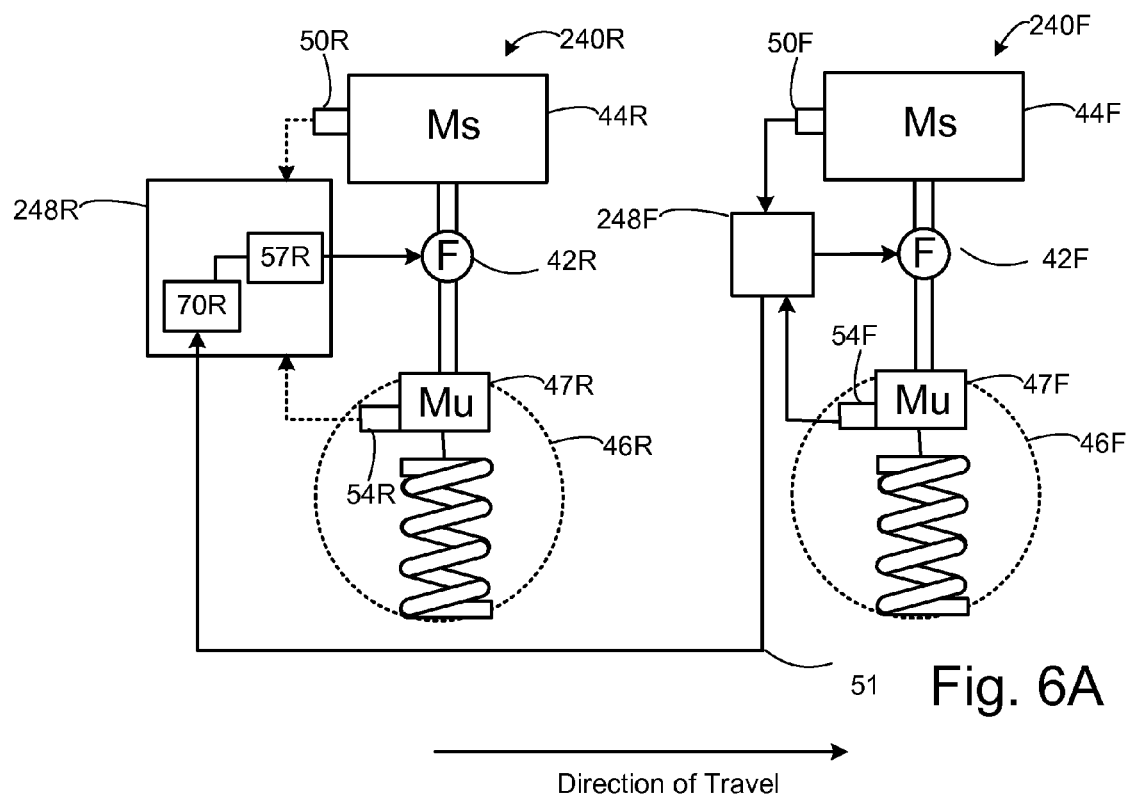
FIG. 6A is a logical arrangement of a front and a rear suspension element.
Figure 6B:
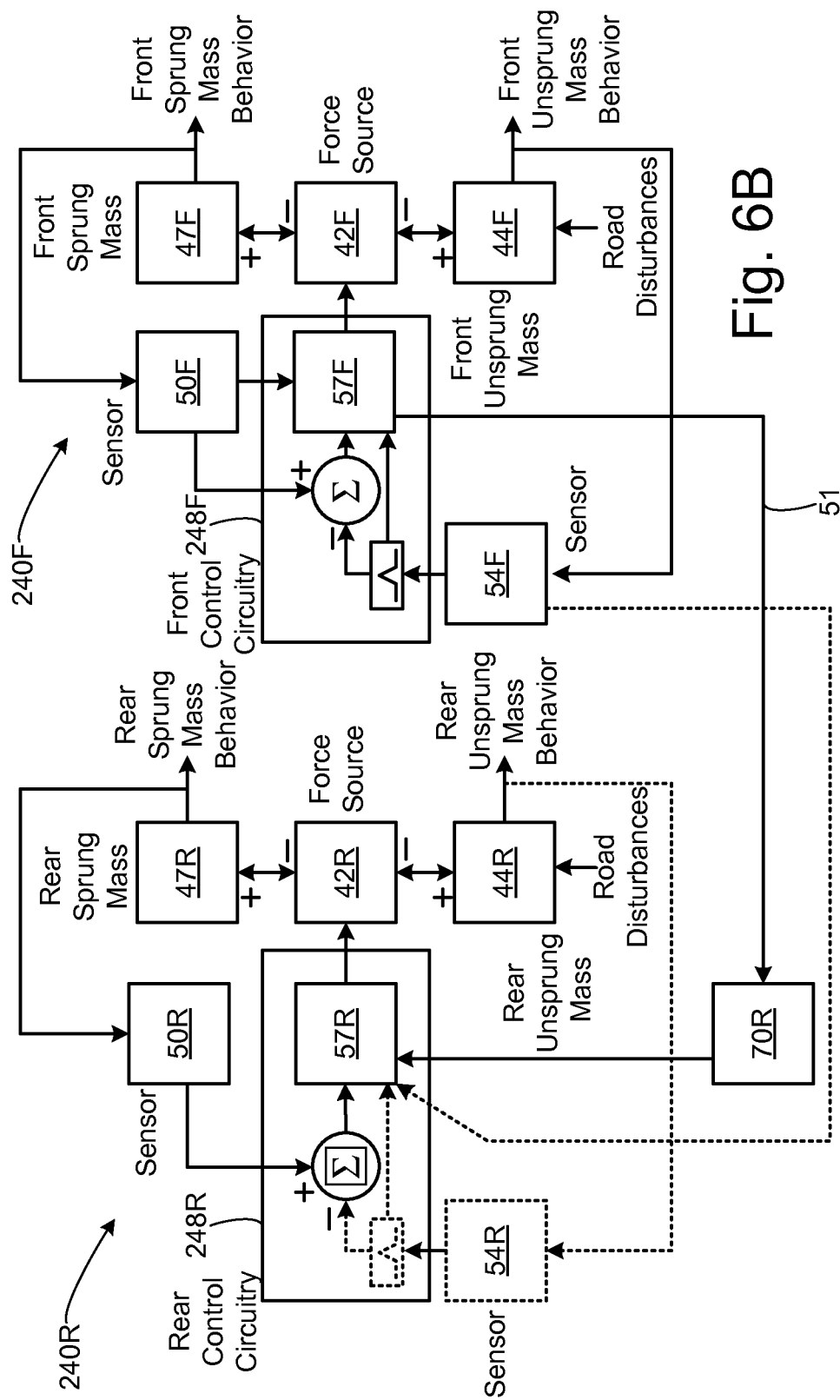
FIG. 6B is a block diagram of the front and rear suspension elements of FIG. 6A.

The suspension system of FIGS. 6A and 6B shows front and rear suspension systems, 240F and 240R, respectively. Each of the front and rear suspension systems includes the same elements as the suspension system of FIGS. 3A and 3B, which an additional element 70R that will be explained below. FIG. 6B represents the suspension system of FIG. 6A, expressed as elements of a block diagram of a closed loop feedback control system. Like numbers are the block diagram representations of the corresponding element of FIG. 6A. The "R" suffix refers to elements of the rear suspension system and the "F" suffix refers to elements of the front suspension system. In the suspension system of FIGS. 6A and 6B, information (for example the pattern of disturbances of the road) from the front suspension 240F is provided to the rear suspension system 240R, as indicated by line 51. The front suspension system 240F and the rear suspension system 240R may be operationally coupled by line 51 through an anti-causal (sometimes referred to as acausal) filter 70R. Alternatively, the anti-causal filter may logically be considered a part of the rear control circuitry 248R. An anti-causal filter is a filter with an impulse response that has content before t=0 and will be discussed in more detail below.

"Front" and "rear", as used below, are defined as consistent with the direction of travel such that the front wheels are the set of wheels that lead and encounter road disturbances before the rear wheels. Since the front and rear wheels on each side of a vehicle typically encounter the same road disturbances at different times, the information communicated from the front suspension system to the rear suspension system indicated by line 51 provides a preview (in distance and time) of the road pattern of road disturbances. The amount of distance preview depends on the wheelbase of the vehicle and the speed at which the vehicle is traveling. For example, a small vehicle with a 2.5 m wheelbase traveling at a high speed of 35 m/sec has about 0.07 of sec preview and a large vehicle with a 3 m wheelbase traveling at a slow speed of 10 m/sec has about 0.3 sec of preview. In this interval, the rear suspension system control circuitry 248R can prepare the rear suspension system so that it can perform better (in terms of one or more of the comfort of the vehicle passengers, energy consumption, and control of wheel hop) than if the preview information were not available.

In operation, the front suspension system operates in the manner described above in the discussion of FIGS. 3A and 3B. Road information is provided to the rear anti-causal filter 70R as indicated by line 51. The rear anti-causal filter 70R calculates an open loop force pattern appropriate to the road information in a manner that will be discussed below in the discussion of FIG. 7. The open loop force pattern may then be provided to the rear force source 42R. In theory, the rear suspension system of FIGS. 6A and 6B can be operated as a completely anti-causal open loop system; that is, the rear force source 42R applies an open loop force pattern determined by rear anti-causal filter 70R only. The rear control circuitry 248R may merely pass through the open loop force and may perform no additional processing, so that the vertical displacement data from rear sprung mass sensor 50R and rear unsprung mass sensor 54R are unnecessary, as indicated by the dashed lines. However, it may be advisable for the rear controller 248R to adjust the open loop force using vertical displacement data from rear sprung mass sensor 50R and rear unsprung mass sensor 54R to correct for imprecision in the models and assumptions used by the anti-causal filter 70R and by other factors, for example if the rear wheel tracks slightly differently than the front wheel.

In an alternate arrangement, the signal from front sensor 54F could be transmitted directly to the rear controller 57R, and the rear controller could determine a force based on the information from front sensor 54F, as shown in dashed lines if FIG. 6B.

FIG. 7 shows a block diagram representation of an anti-causal filter suitable for use as element 70R. Block 71 represents the optional application of delay, so that the open loop force determined by the anti-causal filter 70R is applied at the correct time. Block 72 represents a bandpass filtering of the pattern of vertical disturbances of the road, which may be a causal filtering. Block 74 represents an anti-causal filtering. The filtering block 74 implements a time reversed bandpass filtering operation that is possible because information about a road disturbance to be filtered is available to the filter before the rear wheel encounters the disturbance. Block 76 represents a calculated estimation of the force to be applied by rear force source 42R. Block 76 can be determined using a full ¼-vehicle model or a measured plant transfer function for the vehicle. In one implementation, the force is calculated according to:

$$\Delta z_{tire} = H_{road} z_{road} + H_{force} f_{actuator} = 0 \Rightarrow f_{actuator} = -\frac{H_{road}}{H_{force}} z_{road}$$

where $\Delta z_{tire}$ is the deformation of the tire, where a positive number denotes expansion and a negative number denotes compression; $H_{road}$ is the frequency response function from road displacement to tire expansion; $z_{road}$ is the vertical position, relative to an inertial reference frame, of the road under the contact patch of the tire; $H_{force}$ is the frequency response function from force produced in the actuator to tire expansion; and $f_{actuator}$ is the actuator force. This equation calculates the force it would take to keep the tire from ever expanding or compressing. The sprung mass 44 has little effect at the wheel hop frequency $f_{res}$, so it may be neglected, and we can write the above equations for a ¼ vehicle model to calculate the actuator force necessary to prevent the tire from deforming or to prevent the wheel from moving vertically. In the two cases, we get:

$$\Delta z_{tire} = -\frac{m_u s^2}{m_u s^2 + b_t s + k_t} z_{road} - \frac{1}{+m_u s^2 + b_t s + k_t} f_{actuator} =$$
$$0 \Rightarrow f_{actuator} = m_u s^2 z_{road}$$
$$z_{wheel} = -\frac{b_t s + k_t}{m_u s^2 + b_t s + k_t} z_{road} - \frac{1}{+m_u s^2 + b_t s + k_t} f_{actuator} =$$
$$0 \Rightarrow f_{actuator} = (b_t s + k_t) z_{road}$$

where $m_u$ is the unsprung mass; s is complex frequency vector; $b_t$ is the damping in the tire; and $k_t$ is the tire vertical stiffness. Referring again to FIGS. 6A and 6B, the calculated forces could then be applied by rear force source 42R. The calculated forces can be the sole instructions to the rear force source 42R so that the rear suspension system is operated in an open loop manner. The additional output of block 74 and the output of block 76 will be discussed later. Some of the operations of anti-causal filter 70R may be performed in a different order than shown. For example, the operation of block 71 may be applied in any order relative to the other operations; the operations of blocks 72 and 74 may be performed as shown, or in reverse order.

Referring again to FIG. 7, the operations of blocks 72, 74, and 76 can be performed by a finite impulse response (FIR) filter 77. In one implementation, the FIR filter bandpasses $z_{road}$ forward and backward with a second order anti-notch filter; calculates the impulse response in the actuator force of a damped system; reverses with respect to time the response (as will be discussed later); and may scale the reversed impulse response to build up a portion, for example half, of the total energy of the suspension system (that is, the energy injected into the suspension system and the energy dissipated by the suspension system), so that a part of the energy is injected into the suspension system before the rear wheel encounters the road disturbance and the remainder is dissipated after the rear wheel encounters the road disturbance. The build up and dissipating of total energy of the suspension system will be discussed below in the discussion of FIGS. 9A-9D). In other implementations, other filter topologies, for example IIR filters, could be used.

The delay (block 71 of FIG. 7) can be thought of either in terms of time (the time between when sensor 54F detects the road disturbance and when the force is to be applied, which can be before the rear wheel encounters the road disturbance) or in terms of distance (related to the wheel base).

Generally, the use of more complex filters and the capability of exerting the force more in advance of the wheel encountering the disturbance results in a combination of less vertical displacement experienced by the occupants of the vehicle, more efficient energy usage, and lower peak force requirements for the force source 42.

As stated in the discussion of FIGS. 3A and 3B, it is desirable for the band of frequencies in which the active suspension controls displacement of the unsprung mass and does not necessarily control the vertical displacement of the sprung mass to be as narrow as possible. For example, in one implementation, filters 72 and 74 are a fourth order highpass filter with a break frequency at the tire hop frequency (for example 12 Hz) multiplied by a second order lowpass filter with a break frequency at the tire hop frequency. The resulting band pass filter is adjusted in gain to have a unity gain at the tire hop frequency and passed forward and backward, resulting in a net magnitude effect of an eighth order roll off above and below the tire hop frequency, without any phase lag. The use of information from the front wheel permits the rear wheel suspension to use a relatively high order (in this example eighth order) filter, which results in a narrower bandwidth of the unsprung mass damping frequency band, which results in less vertical displacement being perceived by the occupants of the vehicle.

As stated previously, in theory the rear controller 248R can operate as an open loop system, and it is theoretically not necessary for the rear controller to perform any additional calculation to control wheel hop. However, in actual implementations, it may be advisable for the rear controller 248R to improve the performance of the rear suspension system by correcting for calculation errors. FIG. 8 shows some elements of a suitable rear controller 248R and some other elements of the suspension system of FIG. 6B. The rear controller 248R includes a delayed road model 502 operationally coupled to a plant model 504. The plant model 504 may be simple, for example, modeled as a spring representing the tire, and a mass, representing the unsprung mass. The plant model could also be more complex, for example, also including the sprung mass 44 of FIGS. 2A, 3A, and 6A, the support spring 43 of FIG. 2A, a damper between the sprung mass 44 and the unsprung mass 47, and the force source 42. The plant model 504 is coupled to force calculation circuitry 506 and to the output of unsprung mass sensor 54R through summer 508. The force calculation circuitry 506 is coupled to the force source 42 through summer 510.

In operation, road model 502 receives input from block 74 of FIG. 7 and applies a an additional time delay to account for the full delay between the front and rear wheels impacting the road disturbance. The plant model 504 receives as input the force from force calculation block 76 and the road estimate from delayed road model 502 and predicts the effect of the force from block 76 on an unsprung mass with the characteristics stored in block 504 of a vehicle traveling on the estimated road from road model block 502. Summer 508 differentially combines the actual behavior (the vertical displacement) of the unsprung mass measured by unsprung mass sensor 54 with the predicted behavior (the vertical displacement) from block 504 so that the output of summer 508 is an error signal representing the difference between the predicted behavior and the actual behavior of the unsprung mass. The difference may be attributable to imprecision of one or more of the road model, the plant model, or the calculated force or other factors, for example the rear wheel tracking slightly differently than the front wheel. The force calculation block 506 then calculates the force necessary to correct for the error signal from summer 508. The calculated force from block 508 is then summed at block 510 with the force from block 76 and the summed forces are then applied by rear force source 42R.

Figure 9A:
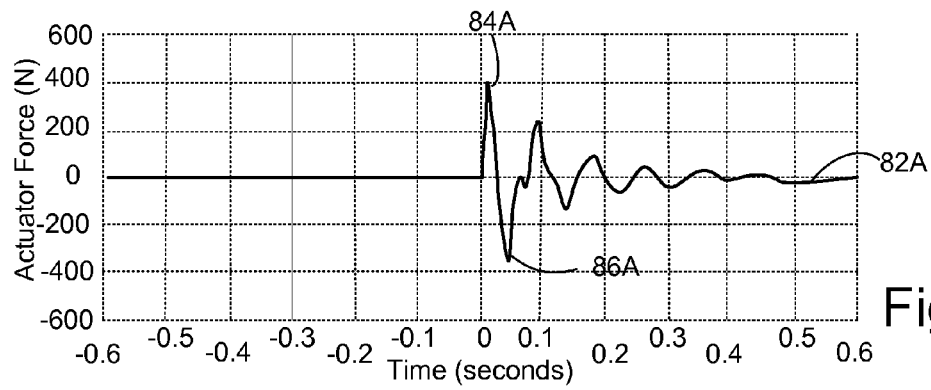
FIGS. 9A-9D are plots of actuator force vs. time.
Figure 9B:
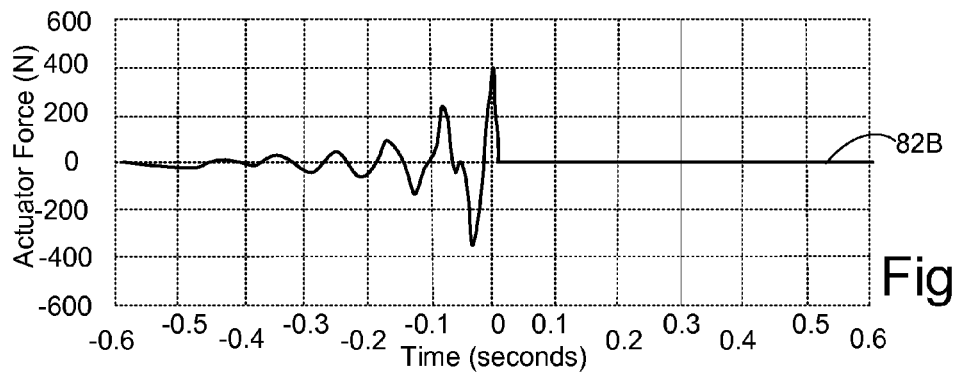

FIGS. 9A-9D illustrate the anti-causal operation of the force calculation block 76 (or force calculation block with error correcting blocks shown in FIG. 8). In FIGS. 9A-9D, the vertical axis is force applied by the force source 42 (of previous figures), with positive values representing force urging the sprung mass and the unsprung mass apart, and negative values representing the force urging the spring mass and the unsprung mass together. The horizontal axis represents time, with t=0 representing the time at which the rear wheel encounters the road disturbance; negative time values represent the application of force before the rear wheel encounters the road disturbance. The application of force, particularly at peak force points 84A and 86A, may be perceived by the occupants of the vehicle cabin. FIG. 9A shows a purely causal damping command, where all force is applied after and in response to the road disturbance. The force pattern of FIG. 9A might be the force pattern of the front wheel, or of the rear wheel in a system in which information from the front wheel is not used by the rear wheel control circuitry. FIG. 9B shows a theoretical use of force calculation block 76. In FIG. 9B, the actuator force causes system states, for example, the position and velocity of the unsprung mass 47 and the sprung mass 44 to be the opposite at time t=0 of FIG. 9A. One way for causing the system states to be the opposite as at time t=0 of FIG. 9A is to reverse in time the response of curve 82A of FIG. 9A and apply the reversed response to the system so that at time t=0, the vertical velocity (indicative of the kinetic energy) and the vertical position (indicative of the potential energy) of the unsprung mass are the same at time t=0 of curve 82B of FIG. 9B as at time t=0 of curve 82A of FIG. 9A. When the wheel encounters the impulse at time t=0, the energy imparted to the system by the impulse matches the energy removed from the system by the operation of the actuator and there is no resultant displacement in the system after the impulse. The operation of an anti-causal filter as shown in FIG. 9B, is illustrative theoretically, but would be of limited practical use. The occupants of the vehicle cabin would experience the same force profile as in FIG. 9A (and therefore the same level of discomfort), except that the force profile would be reversed and would occur before the vehicle encounters the disturbance.

Figure 9C:
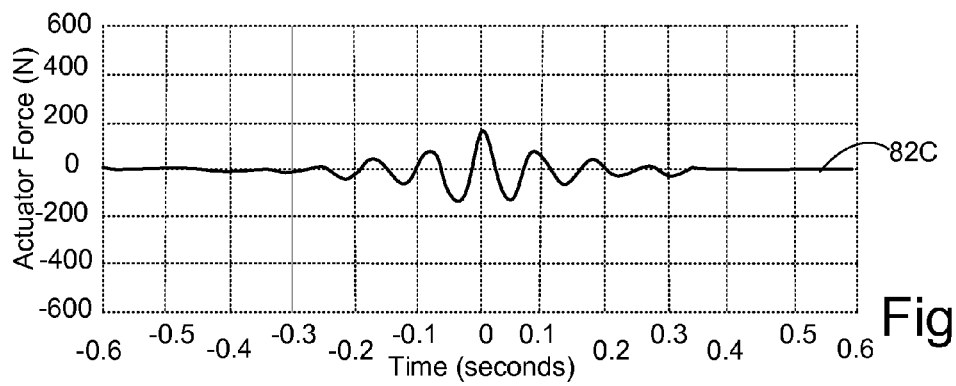

Curve 82C of FIG. 9C shows another example of the operation of force calculation block 76. In the example of FIG. 9C, the impulse response that would occur in the absence of the anti-causal filtering is reversed in time and applied with a scaled amplitude (for example so that half the energy imparted by the impulse is removed prior to time t=0). The result is that (unlike curve 82B of FIG. 9B) there is a response subsequent to time t=0, but the peak force applied by the actuator is significantly less than in FIG. 9A or 9B, and the force is applied over a longer period of time.

Figure 9D:
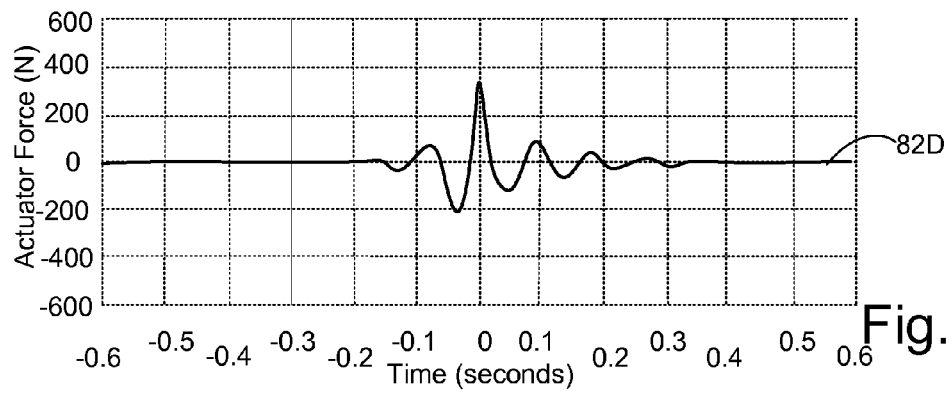

Curve 82D of FIG. 9D is similar to curve 82C of FIG. 9C, except the scaled force is applied over a shorter period of time prior to encountering the disturbance, in this case about 0.2 seconds. Reducing the period of time over which the force is applied may be desirable or necessary if the time available for applying the force is limited because the vehicle is traveling at a high rate of speed which decreases the time interval between the front wheel's encountering of the disturbance and the rear wheel's encountering of the same disturbance. If the scaled force is applied over a shorter period of time, the peak force required may be more than if the scaled force is applied over a longer time period. For example for the case of FIG. 9D, $$\hat{F}_{pre} = F_{pre} \frac{\max(F_{post})}{\max(F_{post}) + \max(F_{pre})},$$

where $\hat{F}_{pre}$ is the scaled pre-impact force, $F_{pre}$ is the unscaled pre-impact force, and $F_{post}$ is the post impact force.

The application of force by the force source 42 according to curves 82C and 82D of FIGS. 9C and 9D, respectively, is advantageous because the peak energy usage is a lower magnitude, so that the peak force that the force source 42 must be capable of applying can be lower, and the magnitude of the vertical displacement of the passenger compartment can be less so that the vertical displacement is less perceptible (or even imperceptible) by the occupants of the passenger compartment.

In addition to the energy related method of developing the force, calculation block 76 can use other techniques to develop the force. For example, the force pattern may be determined using finite time horizon linear-quadratic regulator (LQR) techniques.

Figure 10A:
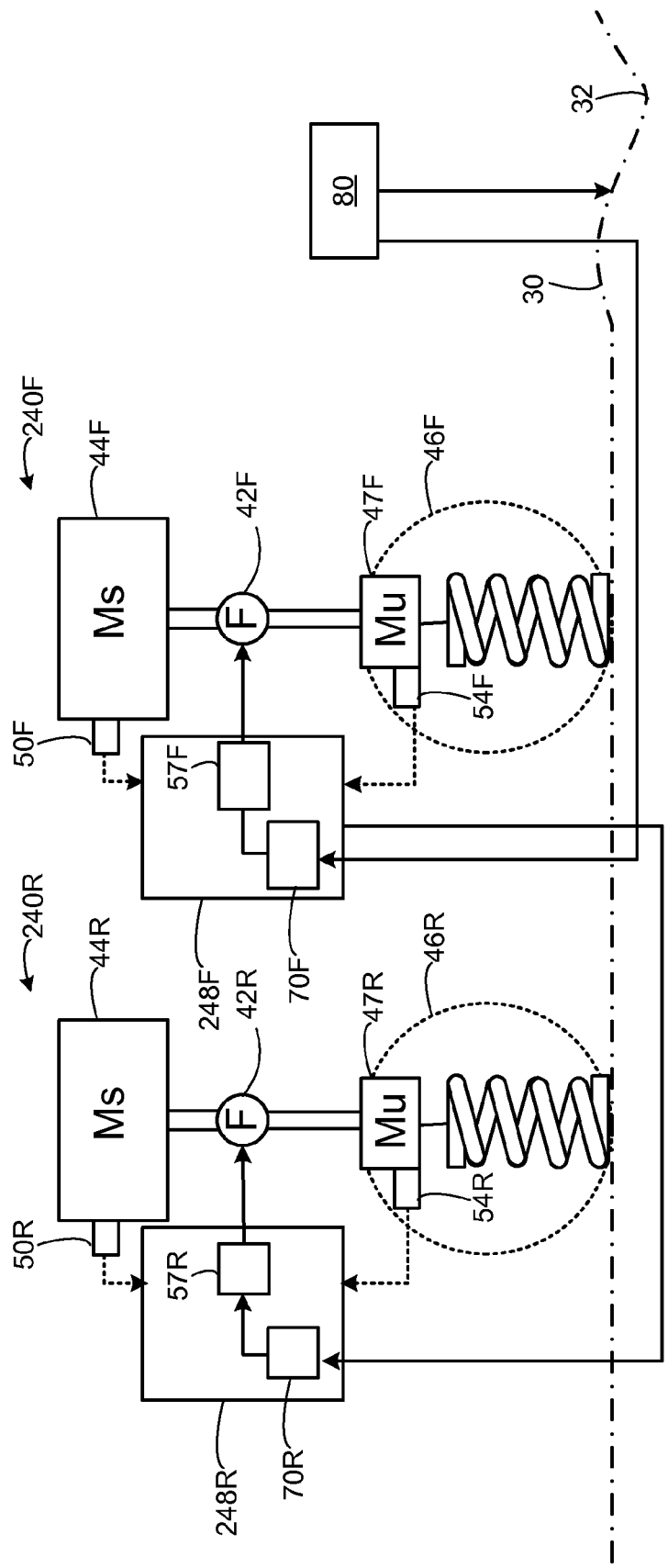
FIG. 10A is a logical arrangement of a front and a rear suspension element.
Figure 10B:
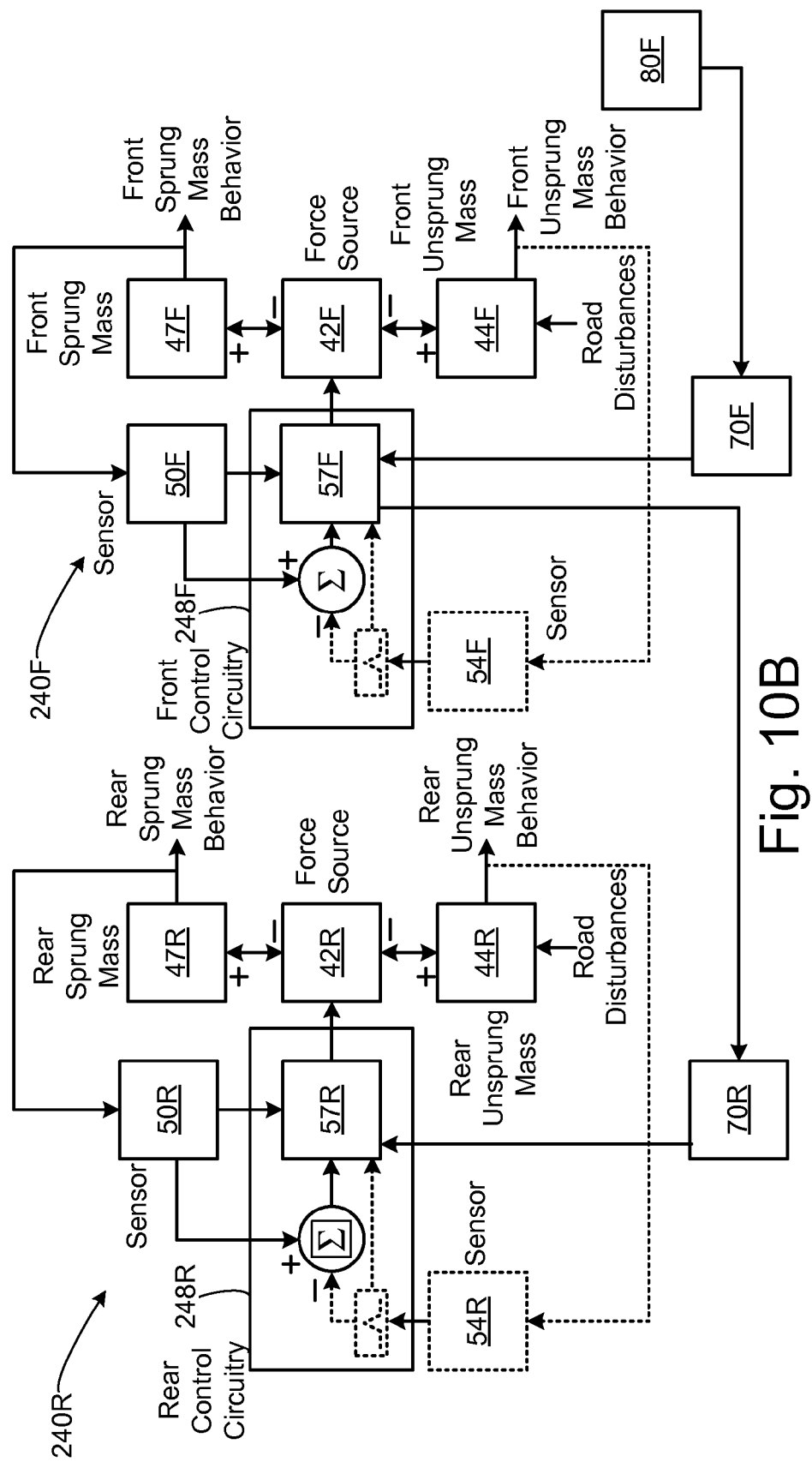
FIG. 10B is a block diagram of the front and rear suspension elements of FIG. 10A.

The techniques described in previous figures can be applied in other ways. For example, the information about road disturbances that the wheel has not yet encountered may be obtained from sources other than a sensor associated with the front wheel and the concepts applied previously to the rear wheel can also be applied to the front wheel. For example, the suspension system of FIGS. 10A and 10B includes all the elements of FIGS. 6A and 6B. The front control circuitry 248F or the rear control circuitry 248R or both may have the same components as the like numbered elements of FIGS. 3B and 6B. Some components of FIGS. 3B and 6B are not needed for the explanation of FIG. 10B and are not shown in this view. In addition to the components of FIG. 6B, the front suspension system 240F includes a front anti-causal filter 70F, and the system further includes a road disturbance detector 80, for example an optical device located in the front bumper or a device that makes physical contact with the road. The road disturbance detector detects road disturbances 30, 32. The road disturbance detector 80 provides the information to the front anti-causal filter 70F, which operates in the manner described above in the discussion of rear anti-causal filter 70R. There may be other methods for obtaining information about vertical road disturbances prior to a wheel encountering the disturbance. In another example, instead of road disturbance detector 80, the suspension system is provided with a road disturbance according to U.S. Pat. No. 7,195,250 of sufficient granularity (for example, low pass filtered at a frequency greater than $f_{res}$).

Figure 11A:
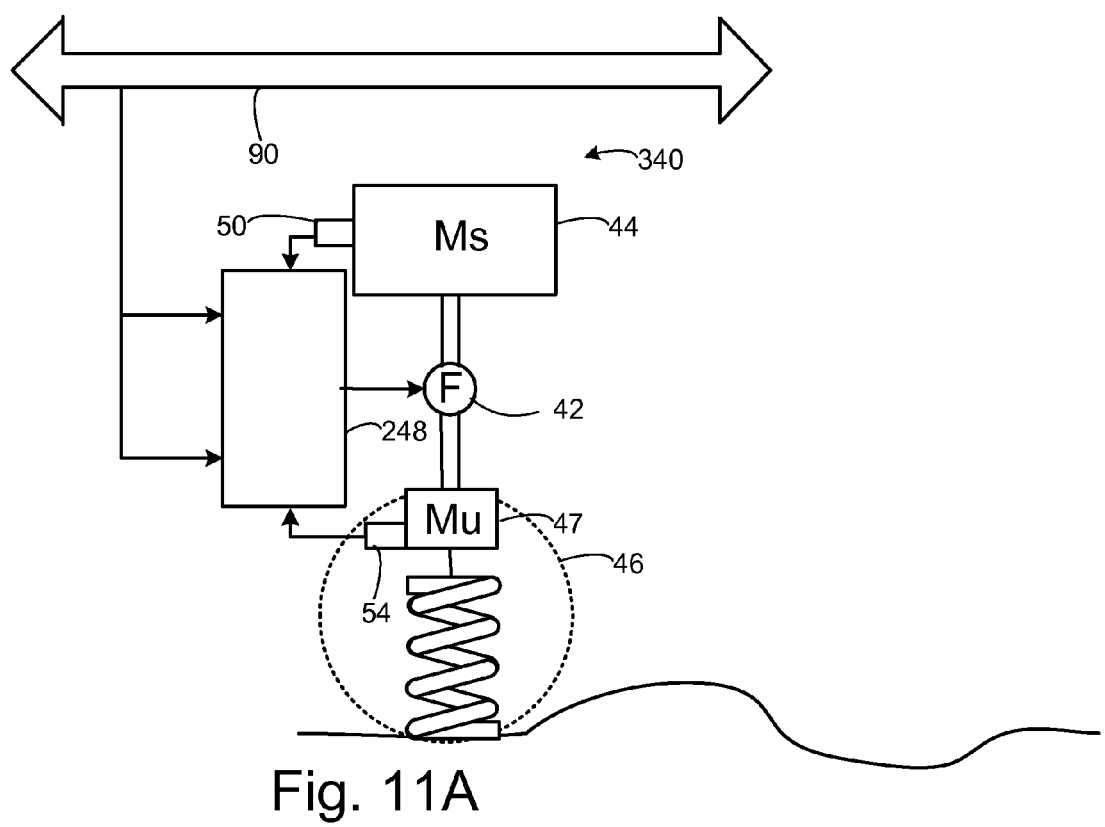
FIG. 11A is a logical arrangement of a suspension element.
Figure 11B:
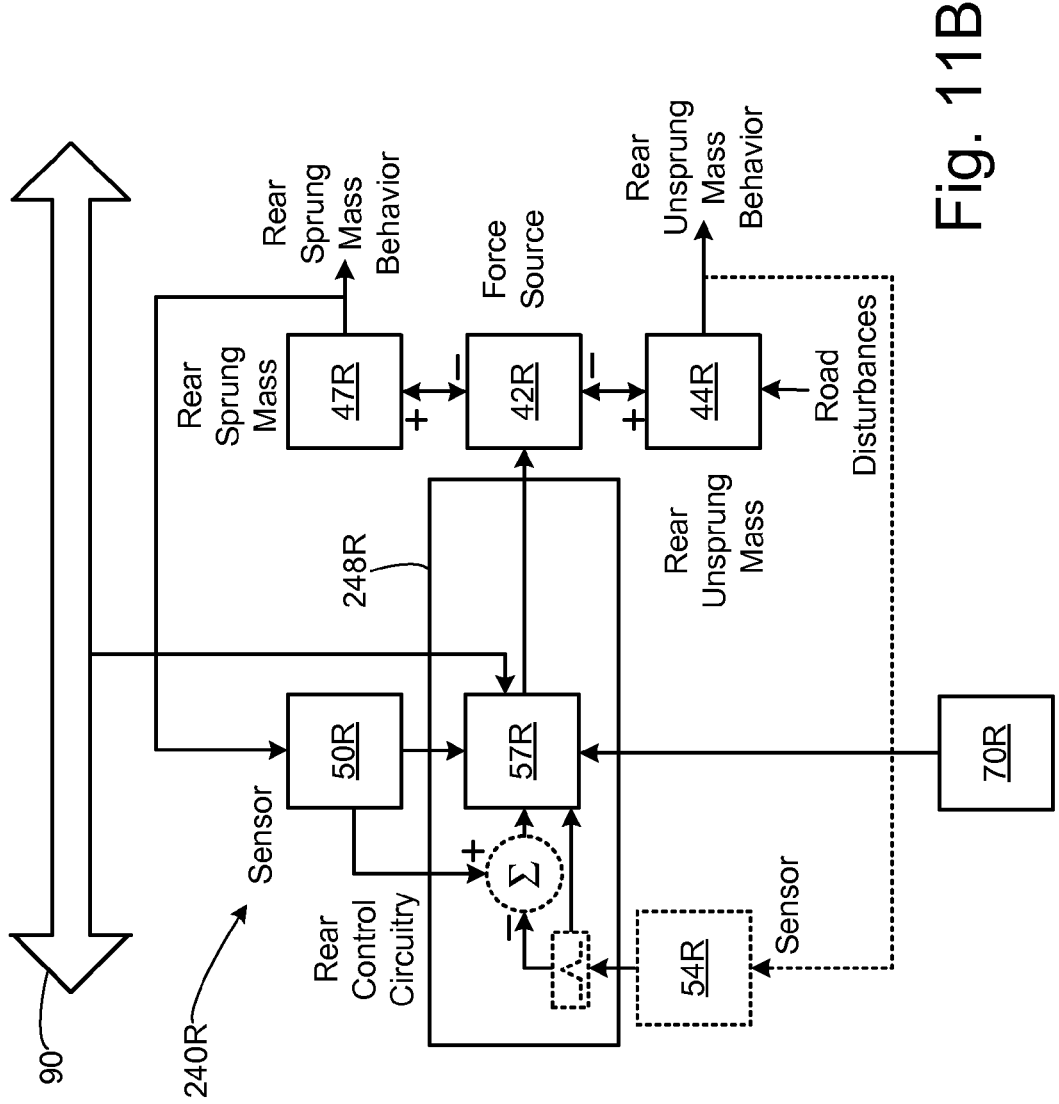
FIG. 11B is a block diagram of the suspension element of FIG. 11A.

FIGS. 11A and 11B show another active suspension system. The suspension systems of FIGS. 11A and 11B include the elements of the suspension systems of FIGS. 3A and 3B. Elements of FIGS. 11A and 11B include the features and functions of the similarly named elements of the suspension systems of FIGS. 3A and 3B. In addition to the elements of FIGS. 3A and 3B, control circuitry 248R is operationally coupled to receive information from the high speed vehicle bus 90. Information on the high speed vehicle bus 90 includes information important to the operation of the vehicle. The controller 248R can use information from the high speed data bus 90 to activate, deactivate, or alter the operation of the rear suspension system. For example, traction is more important at some times (for example when the vehicle is accelerating, decelerating, or turning) that at other times (for example when the vehicle is traveling in a straight line at a constant speed), so when a situation in which traction is less important is detected, the elements relating to control of the unsprung mass can be temporarily disabled (as indicated by the dashed lines) and vertical displacement of the sprung mass only can be controlled over a full bandwidth. In another example, if the road is smooth, the unsprung mass control circuitry can reduce the gain of the control circuit.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. An apparatus comprising:
   sprung vehicle components including a vehicle cabin;
   unsprung vehicle components, including a wheel; and
   a suspension element, comprising:
     a sensor configured to identify a road disturbance prior to the wheel's encountering the road disturbance;
     a controller configured to anti-causally determine a force to reduce vertical displacement of a portion of the vehicle resulting from the wheel's encountering the road disturbance;
     and
     a force source for exerting the anti-causally determined force prior to the wheel's encountering the road disturbance;
   wherein the anti-causally determined force is based on the road disturbance identified prior to the wheel having encountered it.

2. The apparatus of claim 1, wherein the controller for anti-causally determining the force determines a force to reduce vertical displacement of the unsprung mass over a first range of frequencies and determines a force to reduce displacement of the sprung mass over a range of frequencies above the first range of frequencies and a range of frequencies below the first range of frequencies.

3. The apparatus of claim 2, wherein the controller for anti-causally determining the force to reduce vertical displacement comprises a processor for:
   determining, prior to the wheel's encountering the road disturbance, an estimated response of a suspension system of the vehicle to the road disturbance; and
   reversing with respect to time the estimated response of the suspension system to provide the anti-causally determined force.

4. The apparatus of claim 1, wherein the controller for anti-causally determining the force to reduce vertical displacement comprises a processor for;
   determining, prior to the wheel's encountering the road disturbance, what at least two states of a suspension of the vehicle would be when the wheel encounters the road disturbance to provide estimated state values; and
   determining, prior to the wheel's encountering the road disturbance, a force to cause the at least two states of the vehicle suspension to have the estimated state values to provide an anti-causal force.

5. The apparatus of claim 1, wherein the controller for anti-causally determining the force to reduce vertical displacement comprises a processor for:
   calculating, from a model of a road surface and a model of the vehicle, a predicted motional behavior of a portion of the vehicle resulting from the anti-causally determined force being applied to the portion of the vehicle;
   comparing the predicted behavior with the actual behavior of the portion of the vehicle to provide an error signal;
   determining a correcting force to reduce the error signal;
   combining the correcting force with the anti-causally determined force to provide a combined force; and
   applying the combined force to the vehicle portion.

6. A vehicle suspension for controlling motion of a sprung and unsprung mass comprising:
   a force source which is capable of applying a force in response to a control signal and without a physical stimulus, the force source coupling a vehicle unsprung mass and a vehicle sprung mass;
   a sensor configured to detect vertical motion of the sprung mass or a quantity from which vertical motion of the sprung mass can be derived;

an unsprung mass sensor configured to detect vertical motion of the unsprung mass or a quantity from which vertical motion of the unsprung mass can be derived; and control circuitry, responsive to the sprung mass sensor for determining a force to reduce the vertical motion of the sprung mass and responsive to the unsprung mass sensor for determining a force to reduce the vertical motion of the unsprung mass, wherein the control circuitry temporarily reduces the control effort of an unsprung mass control circuit when the control circuitry receives an input from a vehicle information bus that a situation is present where traction between a wheel and a mad surface is less important.

7. The vehicle suspension of claim 6 wherein the control effort is reduced by reducing a gain of a control loop that controls motion of the unsprung mass.

8. The vehicle suspension of claim 6 further comprising a sensor for identifying a road disturbance prior to the unsprung mass encountering the road disturbance, wherein the control circuitry anti-causally determines a force to reduce vertical displacement of a portion of the vehicle sprung mass resulting from the unsprung mass encountering the road disturbance.

9. The vehicle suspension of claim 8, wherein the control circuitry for anti-causally determining the force determines a force to reduce vertical displacement of the unsprung mass over a first range of frequencies and determines a force to reduce displacement of the sprung mass over a range of frequencies above the first range of frequencies and a range of frequencies below the first range of frequencies.

10. The vehicle suspension of claim 8, wherein the control circuitry for anti-causally determining the force to reduce vertical displacement comprises a processor for;

determining, prior to the unsprung mass's encountering the road disturbance, an estimated response of a suspension system of the vehicle to the road disturbance; and reversing with respect to time the estimated response of the suspension system to provide the anti-causally determined force.

11. The vehicle suspension of claim 8, wherein the control circuitry for anti-causally determining the force to reduce vertical displacement comprises a processor for;

determining, prior to the wheel's encountering the road disturbance, what at least two states of a suspension of the vehicle would be when the unsprung mass encounters the road disturbance to provide estimated state values; and determining, prior to the unsprung mass's encountering the road disturbance, a force to cause the at least two states of the vehicle suspension to have the estimated state values to provide an anti-causal force.

12. A vehicle suspension for controlling motion of a sprung and unsprung mass comprising:

a force source which is capable of applying a force in response to a control signal and not in response to a physical stimulus, the force source coupling a vehicle unsprung mass and a vehicle sprung mass;

a sensor configured to detect vertical motion of the sprung mass or a quantity from which vertical motion of the sprung mass can be derived;

an unsprung mass sensor configured to detect vertical motion of the unsprung mass or a quantity from which vertical motion of the unsprung mass can be derived; and control circuitry, responsive to the sprung mass sensor for determining a force to reduce the vertical motion of the sprung mass and responsive to the unsprung mass sensor for determining a force to reduce the vertical motion of the unsprung mass, wherein the control circuitry temporarily increases the control effort of an unsprung mass control circuit when the control circuitry receives an input from a vehicle information bus that a situation is present where traction between a wheel and a road surface is more important.

13. The vehicle suspension of claim 12 wherein the control effort is increased by reducing a gain of a control loop that control motion of the unsprung mass.

14. The vehicle suspension of claim 12 further comprising a sensor for identifying a road disturbance prior to the unsprung mass encountering the road disturbance; wherein the control circuitry anti-causally determines a force to reduce vertical displacement of a portion of the vehicle unsprung mass resulting from the unsprung mass encountering the road disturbance.

15. The vehicle suspension of claim 14, wherein the control circuitry for anti-causally determining the force determines a force to reduce vertical displacement of the unsprung mass over a first range of frequencies and determines a force to reduce displacement of the sprung mass over a range of frequencies above the first range of frequencies and a range of frequencies below the first range of frequencies.

16. The vehicle suspension of claim 14, wherein the control circuitry for anti-causally determining the force to reduce vertical displacement comprises a processor for;

determining, prior to the unsprung mass's encountering the road disturbance, an estimated response of a suspension system of the vehicle to the road disturbance; and reversing with respect to time the estimated response of the suspension system to provide the anti-causally determined force.

17. The vehicle suspension of claim 14, wherein the control circuitry for anti-causally determining the force to reduce vertical displacement comprises a processor for;

determining, prior to the wheel's encountering the road disturbance, what at least two states of a suspension of the vehicle would be when the unsprung mass encounters the road disturbance to provide estimated state values; and determining, prior to the unsprung mass's encountering the road disturbance, a force to cause the at least two states of the vehicle suspension to have the estimated state values to provide an anti-causal force.

18. The vehicle suspension of claim 14, wherein the control circuitry for anti-causally determining the force to reduce vertical displacement comprises a processor for;

calculating, from a model of a road surface and a model of the vehicle, a predicted motional behavior of a portion of the vehicle resulting from the anti-causally determined force being applied to the portion of the vehicle;

comparing the predicted behavior with the actual behavior of the portion of the vehicle to provide an error signal;

determining a correcting force to reduce the error signal;

combining the correcting force with the anti-causally determined force to provide a combined force; and applying the combined force to the vehicle portion.

19. The vehicle suspension of claim 12 wherein the control circuitry temporarily reduces the control effort of an unsprung mass control circuit when the control circuitry receives an input from a vehicle information bus that a situation is present where traction between a wheel and a road surface is less important.

20. The vehicle suspension of claim 19 wherein the control circuitry for anti-causally determining the force determines a force to reduce vertical displacement of the unsprung mass over a first range of frequencies and determines a force to reduce displacement of the sprung mass over a range of frequencies above the first range of frequencies and a range of frequencies below the first range of frequencies.

* * * * *